US009259695B2

(12) United States Patent
Bhopte et al.

(10) Patent No.: US 9,259,695 B2
(45) Date of Patent: Feb. 16, 2016

(54) HONEYCOMB BODY DEVICES HAVING SLOT-SHAPED INTERCELLULAR APERTURES

(75) Inventors: Siddharth Bhopte, Chandler, AZ (US); James Scott Sutherland, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 446 days.

(21) Appl. No.: 13/509,836

(22) PCT Filed: Nov. 22, 2010

(86) PCT No.: PCT/US2010/057598
§ 371 (c)(1), (2), (4) Date: May 15, 2012

(87) PCT Pub. No.: WO2011/066212
PCT Pub. Date: Jun. 3, 2011

(65) Prior Publication Data
US 2012/0222769 A1 Sep. 6, 2012

Related U.S. Application Data

(60) Provisional application No. 61/265,355, filed on Nov. 30, 2009.

(51) Int. Cl.
*F16L 55/027* (2006.01)
*B01F 5/06* (2006.01)
*F28F 7/02* (2006.01)

(52) U.S. Cl.
CPC ............ *B01F 5/0646* (2013.01); *B01F 5/0647* (2013.01); *B01F 5/0682* (2013.01); *B01F 5/0689* (2013.01); *F28F 7/02* (2013.01); *F28F 2220/00* (2013.01); *F28F 2255/16* (2013.01)

(58) Field of Classification Search
CPC ........... C04B 38/0009; C04B 38/0012; C04B 38/0051; B01D 46/2419; B01D 46/2451; B01D 46/2474; B01D 46/2459; B01F 5/0646; B01F 5/0647; B01F 5/0682; B01F 5/0689; F28F 2220/00; F28F 2255/16
USPC .................. 138/37–46; 55/522–424, DIG. 30
See application file for complete search history.

(56) References Cited

U.S. PATENT DOCUMENTS 4,018,211 A * 4/1977 Barr .............................. 126/621
4,155,981 A 5/1979 Chubb .......................... 422/198

(Continued)

FOREIGN PATENT DOCUMENTS

CN 101518705 9/2009
CN 101541710 10/2012

(Continued)

OTHER PUBLICATIONS

Machine Translation of CN101518705.

(Continued)

*Primary Examiner* — Lien Ngo
(74) *Attorney, Agent, or Firm* — Gregory V. Bean

(57) ABSTRACT

A honeycomb extrusion body has multiple cells extending along a common direction from a first end of the body to a second end of the body. The cells are separated by cell walls, and the body has at least one fluid path defined within a plurality of said cells. The fluid path includes one or more apertures, through respective cell walls between cells of one or more respective pairs of said plurality of cells. Each aperture has an aperture width measured perpendicular to the common direction of 90% or less of a cell wall width of the respective cell wall measured perpendicular to the common direction. Optionally one or more of the plurality of cells has at least two cell walls each having an aperture at the same position in the common direction. As a further option, these apertures may be offset from the respective centers of their respective walls in the same rotational direction about a central axis of the cell.

23 Claims, 7 Drawing Sheets

(56) References Cited

U.S. PATENT DOCUMENTS

| | | | | |
|---|---|---|---|---|
| 4,416,610 | A | 11/1983 | Gallagher, Jr. | 431/4 |
| 4,421,702 | A | 12/1983 | Oda et al. | 264/62 |
| 4,464,185 | A * | 8/1984 | Tomita et al. | 55/310 |
| 4,814,081 | A * | 3/1989 | Malinowski | 210/489 |
| 4,882,130 | A * | 11/1989 | Asai et al. | 422/310 |
| 5,103,871 | A * | 4/1992 | Misawa et al. | 138/148 |
| 5,622,046 | A | 4/1997 | Michaels et al. | 60/258 |
| 5,643,484 | A * | 7/1997 | Swars et al. | 219/552 |
| 5,842,787 | A | 12/1998 | Kopf-Sill et al. | 366/340 |
| 6,379,485 | B1 * | 4/2002 | Borglum | 156/89.11 |
| 7,220,506 | B2 | 5/2007 | Cochran et al. | 429/30 |
| 7,340,888 | B2 * | 3/2008 | Zhang et al. | 60/297 |
| RE40,407 | E | 7/2008 | Natarius | 210/788 |
| 7,645,427 | B2 * | 1/2010 | Hirose et al. | 422/180 |
| 8,211,376 | B2 * | 7/2012 | Caze et al. | 422/222 |
| 2001/0049906 | A1 | 12/2001 | Shimazu | |
| 2002/0097633 | A1 | 7/2002 | O'Connor et al. | 366/336 |
| 2002/0117224 | A1 * | 8/2002 | Vakili | 138/39 |
| 2004/0121449 | A1 | 6/2004 | Pugia et al. | 435/287.1 |
| 2006/0051264 | A1 * | 3/2006 | Son | 422/211 |
| 2007/0009426 | A1 | 1/2007 | Leveson | 423/659 |
| 2010/0143215 | A1 | 6/2010 | Caze et al. | 422/198 |

FOREIGN PATENT DOCUMENTS

| | | | | |
|---|---|---|---|---|
| EP | 2098285 | | 9/2009 | |
| GB | 1291297 | | 7/1970 | F16K 11/06 |
| GB | 2001416 | A * | 1/1979 | 422/222 |
| WO | 2004/054696 | | 7/2004 | B01F 5/00 |
| WO | 2008121390 | | 10/2008 | |

OTHER PUBLICATIONS

Machine Translation of CN101541710.

CN201080053538.9 Search Report.

* cited by examiner

HONEYCOMB BODY DEVICES HAVING SLOT-SHAPED INTERCELLULAR APERTURES

This application claims the benefit of priority under 35 USC 119(e) of U.S. Provisional Application Ser. No. 61/265,358 filed Nov. 30, 2009.

BACKGROUND

The disclosure relates to honeycomb extrusion body devices, and more particularly to honeycomb extrusion body devices useful for one or more of heat exchange, mixing, and similar processes.

SUMMARY

The present inventors and/or their colleagues have previously developed processes for forming serpentine channels within a honeycomb extrusion body and devices using such channels beneficially for various fluid processing needs. Generally in such devices, with reference to prior at FIGS. 14 and 15, a honeycomb extrusion body 20 as shown in FIG. 14 includes cells 22 extending from a first end 26 to a second end 28 of the body 20 along a common direction D. Plugs or a sealing material 46 is used to close off a plurality of the cells 22. a serpentine fluid passage 32 may be formed within the plurality of cells closed off by the plugs or sealing material 46. Access to the fluid path 32 may be through an end face as in FIG. 14 or through openings 31 in flats 33 machined on the side faces of the body 20. The resulting device 12 may be used as a reactor or heat exchanger, for example, by flowing reactants or fluids to be heated or cooled along the fluid path 32, while flowing temperature control fluid in parallel along the many cells not closed off. The plan view pattern of the closed off cells and the path 32 they contain may take various forms such as the straight path of FIG. 14 or the serpentine one of FIG. 15.

Some detail of how plugs or seals 46 help form the path 32 are shown in the cross-sectional views of prior art FIGS. 16 and 17. In these figures may be seen selectively lowering walls of the cells of the honeycomb body allows U-bends to be formed along the path 32, joining adjacent cells of the body 20 to each other in a serpentine fluid path 32.

The present inventors have recognized that it would be desirably to improve the utility of the honeycomb extrusion body devices for any combination of heat exchange and mixing and relating processes. An embodiment of the present invention addressing this need takes the form of a honeycomb extrusion body having multiple cells extending along a common direction from a first end of the body to a second end of the body. The cells are separated by cell walls, and the body has at least one fluid path defined within a plurality of said cells. The fluid path includes one or more apertures, through respective cell walls between cells of one or more respective pairs of said plurality of cells. Each aperture has an aperture width measured perpendicular to the common direction of 90% or less of a cell wall width of the respective cell wall measured perpendicular to the common direction.

A further embodiment includes one or more of the plurality of cells having at least two cell walls having an aperture at the same position in the common direction. As a further option, the apertures may be offset from the respective centers of their respective walls in the same rotational direction about a central axis of the cell.

These features, as well as others described herein below, provide increased heat exchange performance, increased mixing performance, increased preservation of emulsions, and the like, by inducing secondary flows within the cells in which the fluid path lies.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
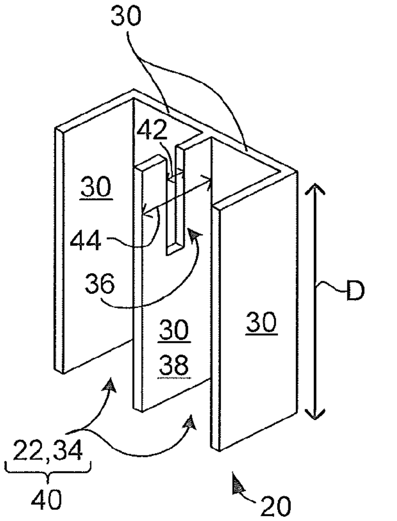
FIG. 1 is a cut-away perspective view of a portion of a honeycomb extrusion body having one embodiment of a slot-shaped intercellular aperture.

Reference will now be made in detail to the present preferred embodiments, examples of which are illustrated in the accompanying drawings. Whenever possible, the same reference numerals will be used throughout the drawings to refer to the same or like parts.

Figure 2:
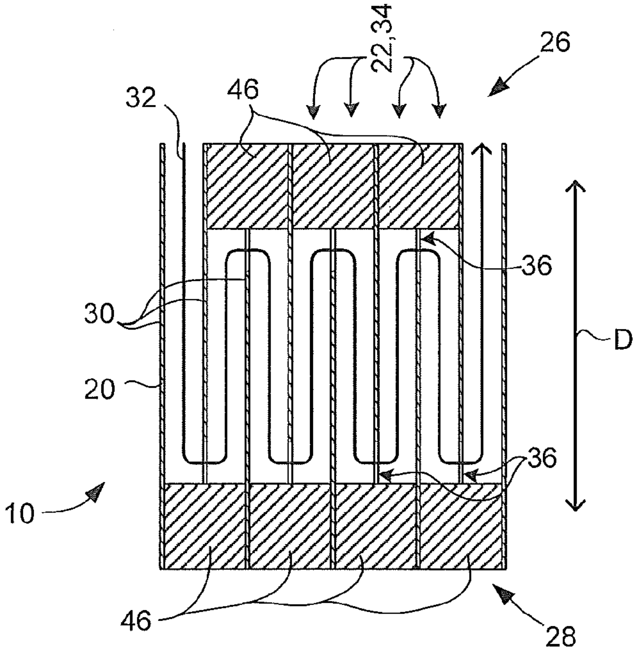
FIG. 2 is a cross section of one embodiment of a honeycomb extrusion body device 10 having a type of slot-shaped intracellular apertures.

One embodiment a slot-shaped intercellular aperture useful in devices disclosed herein is shown in the cut-away perspective view in FIG. 1 of a portion of a honeycomb extrusion body 20, and an embodiment of a device 10 having a type of slot-shaped intracellular apertures is shown in the cross section of FIG. 2. With reference to FIG. 1 and FIG. 2, the honeycomb extrusion body 20 has multiple cells 22 extending along a common direction D from a first end 26 of the body 20 to a second end 28. The cells 22 are separated by cell walls 30. The body 20 has at least one fluid path 32 defined within a plurality 34 of the cells 22. The fluid path 32 includes one or more apertures 36, through respective cell walls 38 between cells 22 of one or more respective pairs 40 of the plurality 34 of cells 22. While other apertures of other types or sizes may also be used within the device 10, if desired, the one or more apertures 36 here at issue have an aperture width 42 measured perpendicular to the common direction of 90% or less of a cell wall width 44 of the respective cell wall 38 measured perpendicular to the common direction D, as seen in FIG. 1.

Figure 3:
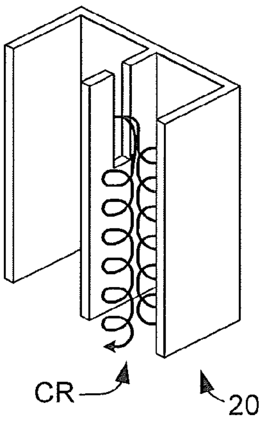
FIG. 3 is a cut-away perspective view of a portion of a honeycomb extrusion body like that of FIG. 1, but with a representation of a counter-rotating flow that may be produced with the devices and methods of the present disclosure.

FIG. 3 is a cut-away perspective view of a portion of a honeycomb extrusion body having like that of FIG. 1, but with a representation of a counter-rotating flow CR that may be produced with the devices and methods of the present invention. Under the appropriate flow conditions, which may be selected by one of skill in the art through simulation or experiment, a fluid traveling from left to right then down within the structure of FIG. 3 generates a counter-rotating flow CR roughly as shown. Such counter rotating flow increases the exposure of the fluid in the path 32 to the walls 30, improving heat exchange in cases where heat exchange through the walls is used, and improving catalytic reactions where catalyst material is used on or in the walls 30. The counter-rotating flow CR can also assist in initial mixing of reactants, or in preserving an emulsion, or the like.

Figure 4:
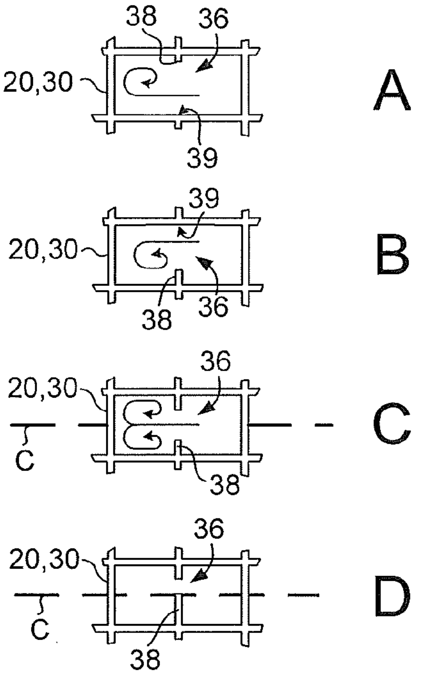
FIGS. 4A-4D are cross-sectional plan views of some variations of apertures 36 useful in the context of the present disclosure.

The apertures 36 useful in the context of the present invention may take various forms. Some variations of apertures 36 are shown in cross-sectional plan view in FIG. 4A-D. For use in the context of the present disclosure, apertures should have an aperture width 42 of 90% or less of the cell wall width 44, and desirably less, such as 75% or less of the cell wall width as in FIG. 4B, 50% or less of the cell wall width as in FIG. 4C, or even 25% or less of the cell wall width as in FIG. 4D. The apertures 36 may be centered, along the direction perpendicular to the common direction D, within the respective cell walls 38, such as in FIG. 4C, in which the aperture 36 lies on a centerline C of the respective cell wall 38. For best performance, apertures that are centered should generally be smaller, such as 75% or even 50% or less of the cell wall width. The apertures 36 may also be offset from center, along a direction perpendicular to the common direction D, within the respective cell walls 38, such as in FIG. 4A and FIG. 4B, even so much as not to include the centerline C of the respective cell wall 38 within the respective aperture 36, as in FIG. 4D. The apertures 36 may also be so far off center as to be positioned, along a direction perpendicular to the common direction D, against the edge 39 of the respective cell walls 38, as in FIG. 4A and FIG. 4B.

Figure 5:
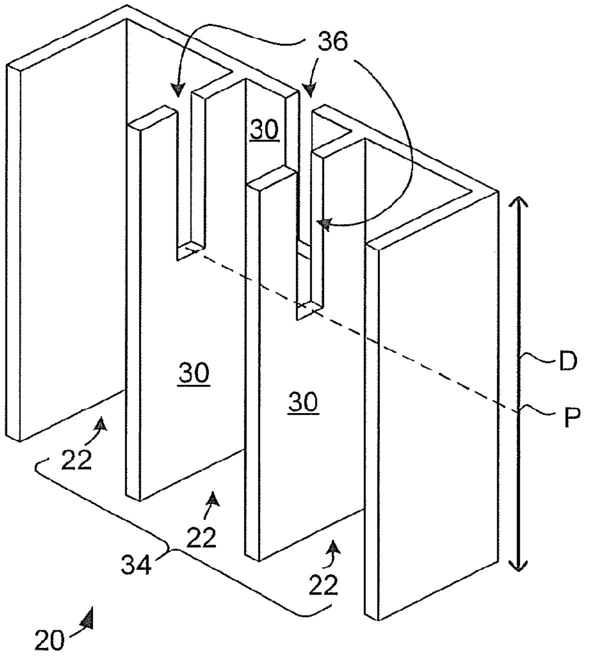
FIG. 5 is a cut-away perspective view of a portion of a honeycomb extrusion body like that of FIG. 1 according to another aspect of the present disclosure, showing three cells with the central cell having multiple apertures at the same position P.

FIG. 5 is a cut-away perspective view of a portion of a honeycomb extrusion body according to another aspect of the present disclosure in which one more of the plurality 34 of cells 22 of the honeycomb body 20 has at least two cell walls 30 having an aperture 36 at the same position P in the common direction D. In the case of the embodiment of FIG. 5, three cells 22 of a body 20 are shown, with the central cell having multiple apertures 36, in this case three, at the same position P in the common direction D.

Figure 6:
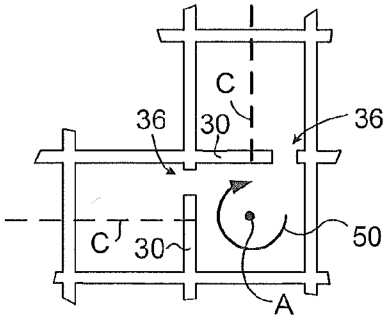
FIG. 6 is a cross-sectional plan view of a few cells of a honeycomb body according to yet another aspect of the present disclosure.

FIG. 6 is a cross-sectional partial plan view showing a few cells 22 of a honeycomb body 20 illustrating another embodiment of the present disclosure in which one or more of the plurality 34 of cells 22 of the honeycomb body 20 has at least two cell walls 30 having an aperture 36 at the same position P, along direction D. (Direction D is in and out of the FIG. 9*n* this case, and thus not viewable.) In the embodiment of FIG. 6, the multiple apertures 36 are offset from the respective center lines C of their respective walls 30 in the same rotational direction 50 about a central axis A of the cell.

Figure 7:
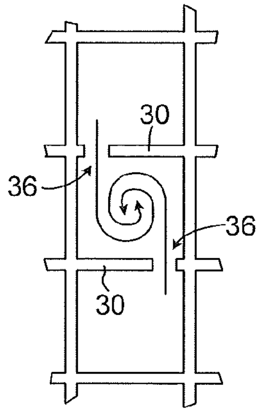
FIG. 7 is a cross-sectional plan view of a few cells of a honeycomb body according to still another aspect of the present disclosure.

According to another aspect of the present disclosure shown in the plan view cross section of FIG. 7, the at least two cell walls 30 having apertures 36 at the same position P are facing each other within the cell. This structure can produce good mixing of two fluids entering the cell, as the intertwining spiraling of the fluids (suggested by the arrows in the central cell) elongates the interface between them. Note that the use of the devices of the present invention is not limited to the flow direction shown in this figure. It would be beneficial in some devices or for some applications to flow fluid from a single cell out through multiple apertures at the same position P, for example.

Figure 8:
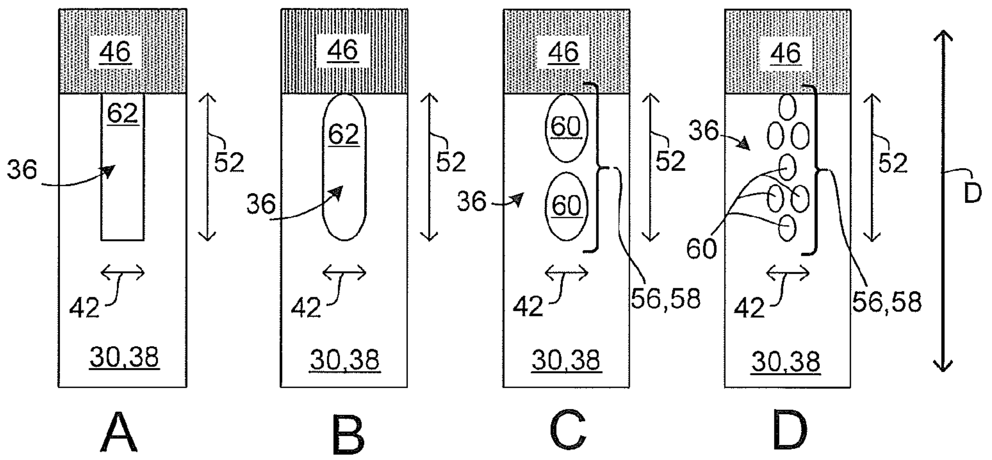
FIGS. 8A-8D are diagrammatic elevation views of individual cell walls showing various alternatives useful in the context of the present disclosure.

According to another aspect of the present disclosure, with reference to the in diagrammatic elevation views of individual cell walls 30 in FIGS. 8A-8D, one or more apertures 36 in the honeycomb body 20 have an aperture length 52 measured parallel to the common direction D and an aperture width 42 measured perpendicular to the common direction D and a ratio of aperture length 52 to aperture width 42 of at least 1.5 or more. The ratio of aperture length 52 to aperture width is desirably at least 3 or more, and more desirably at least at least 5 or more. By aperture length is meant the open aperture length after plugging. Where the aperture 36 before plugging has an open edge (not shown in this figure), the plug or seal 46 reduces the aperture length 52 as in the case of the aperture 32 of FIG. 8A. Where the aperture 36 has no open edge before plugging, the plug or seal 46 preferably is positioned at or near, but not over, the closest edge of the aperture 36, as in FIGS. 8B-8D. As shown in FIGS. 8C and 8D, at least some the one or more apertures used in devices according to the present disclosure may be composite apertures 56 each consisting of a group 58 of multiple openings 60 in the respective wall 38 positioned together to form a respective composite aperture 56 having an aperture length 52 and an aperture width 42 defined by the length and width of the Apertures 36 consisting of a single opening 62 in the respective wall 38, as in FIGS. 8A and 8B may be desirable to minimize flow resistance, while composite apertures 56 formed of multiple openings 60, as in FIGS. 8C and 8D, may be desirable to maximized strength of the respective wall 38.

In the context of the present disclosure, it is desirably that the apertures 36 are each positioned relatively close to a plug or seal 46 that closes the respective pair 40 of cells 22 at one side of the respective aperture 36, as shown generally for example in FIGS. 8A-8D and in FIGS. A and B taken together. Generally, such a plug or seal 46 closes the cells 22 of the pair 40 at one of the first end of the body 26 and the second end of the body 28, as in FIG. 2. As shown in FIG. 2, according to one embodiment of the present disclosure, the at least one fluid path 32 comprises multiple apertures 36 in succession.

Figure 9:
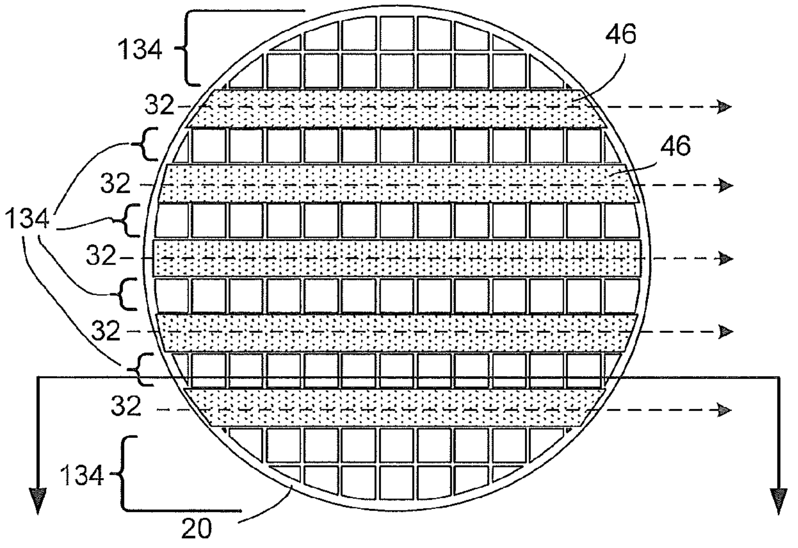
FIG. 9 is a plan view of another embodiment of an extruded body device of the present disclosure.

According to another aspect of the present disclosure, shown in plan view in FIG. 9, more than one fluid path 32 may be contained within a single honeycomb extrusion body 20.

Figure 10:
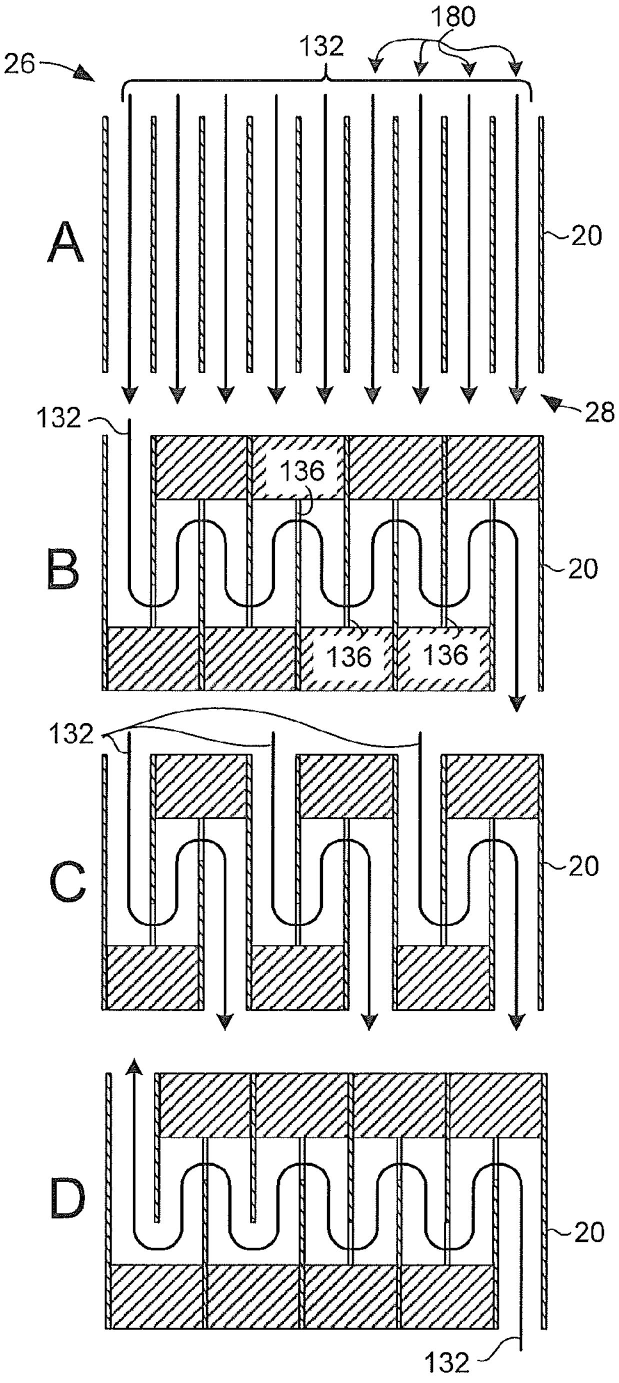
FIGS. 10A-10D are alternative cross sections of the body 20 of FIG. 9, taken along the line indicated in FIG. 9.

Whether there is one path 32 or more than one, there are multiple options for cells not part of the one or more paths 32. Some of these options are shown in FIGS. 10A-10D, which are alternative cross sections of the body 20 of FIG. 9, taken along the line indicated in FIG. 9. further aspect of the present disclosure is shown in According to the embodiment shown in FIG. 9, the body 20 comprises an additional plurality 134 of cells 22 at least some of which are adjacent the plurality 34 of cells 22 in which the fluid path or paths 32 lie. The additional plurality 134 of cells 22 desirably contains at least one additional fluid path 132 within the body 20. Examples of such paths 132 are seen in FIGS. 10A-10D. In the embodiment of FIG. 10A the additional fluid path 132 comprises parallel straight passages 180 from the first end 26 to the second end 28 of the body 20. In the embodiment of FIG. 10B the additional fluid path 132 includes one or more apertures 136, the apertures 136 extending through a respective cell wall between one or more respective pairs of said additional plurality 134 of cells and having an aperture width measured perpendicular to the common direction of 90% or less of a cell wall width of the respective cell wall measured perpendicular to the common direction. This embodiment of FIG. 10B also comprises multiple apertures 136 in succession along the additional fluid path 132. In the embodiment of FIG. 10C, multiple short paths make of the additional fluid path 132, each short path having its own apertures. In the embodiment of FIG. 10D, some walls separating adjacent cells along the path are removed complete, thus the frequency of apertures 136 along the path 132 varies. From these last two embodiments may be seen that the fluid path 32 and the additional fluid path 132 may differ in one or both of (1) frequency of apertures 36, 136 as a function of distance along the path 32,132 and (2) path length, if desired.

The honeycomb bodies according to any of the embodiments disclosed herein are desirably formed of ceramic, glass, and glass-ceramic materials, although other honeycomb extrusion bodies may also be used, if desired.

Figure 13:
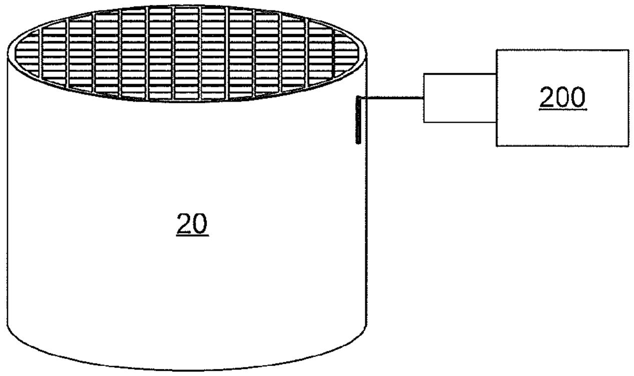
FIG. 13 is a perspective view of one embodiment of a laser machining process for producing honeycomb body devices according to the present disclosure.
Figure 11:
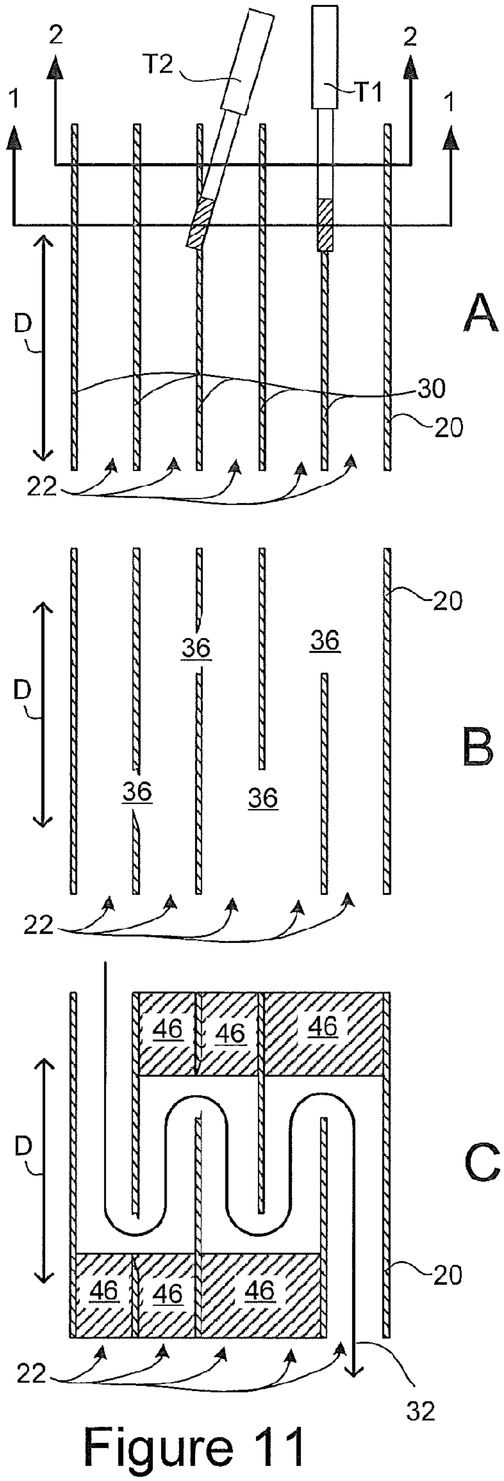
FIGS. 11A-11C and 12A-12C are cross sections and plan views, respectively, of certain steps in a method of producing a honeycomb body device according to the present disclosure.
Figure 12:
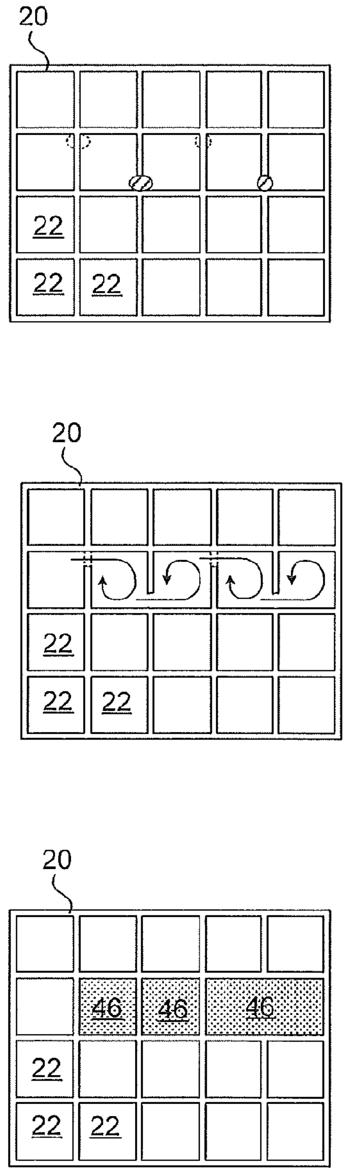
Figure 14:
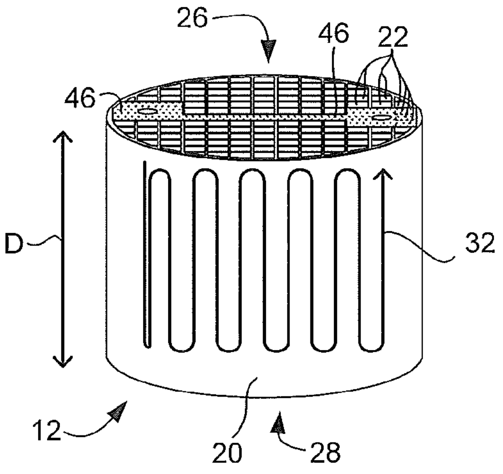
Figure 14 (prior art)
FIGS. 14 and 15 are perspective views of prior art honeycomb body devices developed by the present inventors and/or their colleagues.
Figure 15:
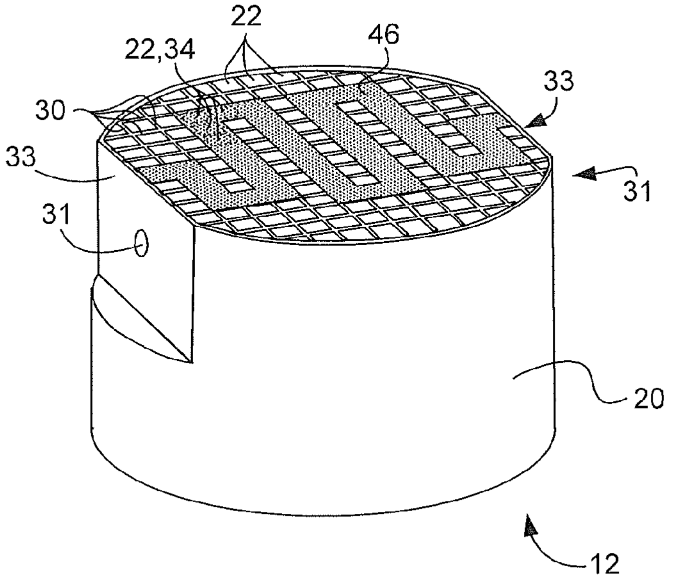
Figure 15 (prior art)
Figure 17:
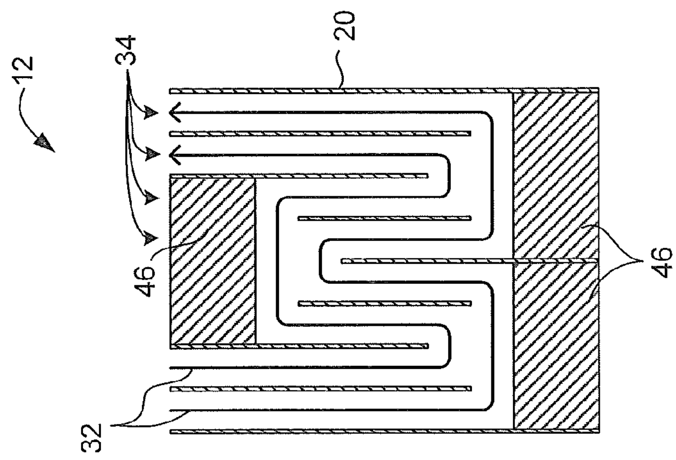
Figure 17 (prior art)
FIGS. 16 and 17 are cross-sectional views of prior art honeycomb body devices developed by the present inventors and/or their colleagues.
Figure 16:
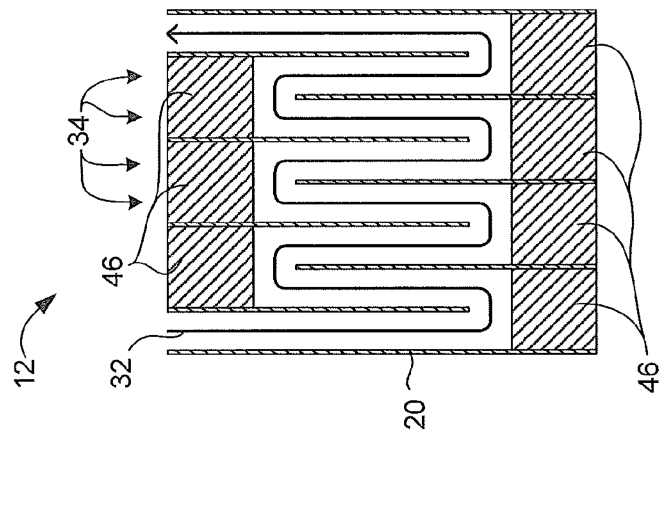
Figure 16 (prior art)

Methods of forming a honeycomb extrusion body device 10 according some embodiments of the present disclosure will be described with reference to FIGS. 11-13.

FIGS. 11A-11C and 12A-12C show cross sections and plan views, respectively, of certain steps in an embodiment of a method of producing a honeycomb body device according to the present disclosure. First, a honeycomb extrusion body 20 is provided, having multiple cells 22 extending along a common direction D from a first end of the body 20 to a second end of the body 20 and separated by cell walls 30. Next, one or more apertures 36, is formed through respective cell walls between one or more respective pairs of said multiple cells, such that each aperture 36 has an aperture width measured perpendicular to the common direction of 90% or less of a cell wall width of the respective cell wall measured perpendicular to the common direction, as discussed with respect to FIG. 1 above. As seen in FIGS. 11A and 11B, aperture formation may be by mechanical machining such as by a plunge cutting tool or any other suitable mechanical method. Energy-based machining such a laser machining, or chemical machining such as etching may also be used if desired.

In FIG. 11A two embodiments are shown of methods of applying machining to the body 20. Both methods apply machining energy or force through one (or both) of the ends 26, 28 of the body 20, but the first method, shown by tool T1, applies machining energy or force directly down on a cell wall along the common direction D. The second method, shown by tool T2, applies machining force or energy at an angle down inside the open end of a cell, to machine a cell wall at an angle and not at the end of the cell wall at the first or second end 26, 28 of the body 20. The first method results in apertures 36 having an open edge at one of the first and second ends of the body, as on the right side of FIG. 11B. The second method results in formation of apertures having no open edge, as on the left side of FIG. 11B. Apertures may be formed at both ends of the body 20, as shown in FIG. 11B. The apertures may also be alternated from left to right, as shown in FIGS. 12A and 12B.

Regardless of which aperture forming method is used, next the respective pairs of cells are plugged or sealed at one side of the associated aperture by formation or use of a plug or seal 46. If the apertures previously had an open edge, the open edge is closed by the plugs or seals 46, such that the final length of the aperture is determined partly by the plugging or sealing process.

If desired, a laser may also be used similarly to the first and second tools T1 and T2, but would particularly be useful for machining on the diagonal as with second tool T2 of FIG. 11A.

As another alternative, a laser 200 may also be used as shown in FIG. 31, to cut one or more apertures at once through the side face rather than through the and end of the body 20. Some apertures would then be excess, to be filled by the plugging or sealing process, or by other means.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

What is claimed is:

1. A honeycomb extrusion body having multiple cells extending along a common direction from a first end of the body to a second end and separated by cell walls, the body having at least one serpentine fluid path, the fluid path having U-bends along the path joining adjacent cells of the body to each other, the fluid path defined within a plurality of said cells, the fluid path including one or more apertures, through respective cell walls between cells of one or more respective pairs of said plurality of cells, each aperture consisting of a single opening in the respective cell wall positioned next to a respective plug or seal that closes the respective pair of cells at one side of the respective aperture, each aperture having an aperture width measured perpendicular to the common direction of 90% or less of a cell wall width of the respective cell wall measured perpendicular to the common direction.

2. The honeycomb body according to claim 1 wherein the one or more apertures have an aperture width of 75% or less of the cell wall width.

3. The honeycomb body according to claim 1 wherein the one or more apertures have an aperture width of 50% or less of the cell wall width.

4. The honeycomb body according to claim 1 wherein the one or more apertures have an aperture width of 25% or less of the cell wall width.

5. The honeycomb body according to claim 1 wherein the plug or seal closes the respective cells at one of the first end of the body and the second end of the body.

6. The honeycomb body according to claim 1 wherein at least some of the one or more apertures are centered, along the direction perpendicular to the common direction, within the respective cell walls.

7. The honeycomb body according to claim 1 wherein at least some of the one or more apertures are offset from center, along a direction perpendicular to the common direction, within the respective cell walls, so as not to include the centerline of the respective cell wall within the respective aperture.

8. The honeycomb body according to claim 1 wherein the one or more apertures are positioned, along a direction perpendicular to the common direction, against the edge of the respective cell walls.

9. The honeycomb body according to claim 1 wherein one or more of the plurality of cells has at least two cell walls having an aperture at the same position in the common direction.

10. The honeycomb body according to claim 9 where the one or more of the plurality of cells has in at least two cell walls at the same position in the common direction, the apertures being offset from the respective centers of their respective walls in the same rotational direction about a central axis of the cell.

11. The honeycomb body according to claim 10 wherein the at least two cell walls are facing each other within the one or more of the plurality of cells.

12. The honeycomb body according to claim 1 wherein the one or more apertures have an aperture length measured parallel to the common direction and an aperture width measured perpendicular to the common direction and a ratio of aperture length to aperture width of at least 1.5.

13. The honeycomb body according to claim 12 wherein the ratio of aperture length to aperture width is at least 3.

14. The honeycomb body according to claim 13 wherein the ratio of aperture length to aperture width is at least 5.

15. The honeycomb body according to claim 1 wherein the at least one fluid path comprises multiple apertures in succession.

16. The honeycomb body according to claim 1 wherein the body further comprises an additional plurality of cells at least some of which are adjacent the plurality of cells in which the fluid path lies, the additional plurality of cells containing at least one additional fluid path within the body.

17. The honeycomb body according to claim 16 wherein the at least one additional fluid path comprises parallel straight passages from the first end to the second end of the body.

18. The honeycomb body according to claim 16 wherein the at least one additional fluid path comprises an additional serpentine fluid path, the additional serpentine fluid path having U-bends along the path joining adjacent cells of the body to each other, the additional serpentine fluid path includes one or more apertures consisting of a single opening in a respective cell wall, the apertures extending through the respective cell wall between one or more respective pairs of said additional plurality of cells and having an aperture width measured perpendicular to the common direction of 90% or less of a cell wall width of the respective cell wall measured perpendicular to the common direction.

19. The honeycomb body according to claim 16 wherein the at least one additional fluid path comprises multiple apertures in succession.

20. The honeycomb body according to claim 16 wherein the at least one fluid path and the at least one additional fluid path differ in one or both of (1) frequency of apertures as a function of distance along the path and (2) path length.

21. The honeycomb body according to claim 1 wherein the cell walls of the honeycomb body comprise one of glass, glass-ceramic, and ceramic.

22. A honeycomb extrusion body having multiple cells extending along a common direction from a first end of the body to a second end and separated by cell walls, the body having at least one serpentine fluid path, the fluid path having U-bends along the path joining adjacent cells of the body to each other, the fluid path defined within a plurality of said cells, the fluid path including one or more apertures, through respective cell walls between cells of one or more respective pairs of said plurality of cells, at least some of said one or more apertures being composite apertures each consisting of a group of multiple openings in the respective wall positioned together and having an aperture length and an aperture width defined by the length and width of the group, said one or more apertures being positioned next to a respective plug or seal that closes the respective pair of cells at one side of the respective aperture and having an aperture width measured perpendicular to the common direction of 75% or less of a cell wall width of the respective cell wall measured perpendicular to the common direction.

23. The honeycomb body according to claim 22 wherein the one or more apertures have an aperture width of 50% or less of the cell wall width.

* * * * *